United States Patent
Roos et al.

(10) Patent No.: US 11,921,211 B2
(45) Date of Patent: Mar. 5, 2024

(54) APPARATUSES AND METHODS FOR A ROTATING OPTICAL REFLECTOR

(71) Applicant: Bridger Photonics, Inc., Bozeman, MT (US)

(72) Inventors: Peter Aaron Roos, Bozeman, MT (US); Michael James Thorpe, Bozeman, MT (US); Aaron Thomas Kreitinger, Bozeman, MT (US); Christopher Ray Wilson, Bozeman, MT (US)

(73) Assignee: Bridger Photonics, Inc., Bozeman, MT (US)

( * ) Notice: Subject to any disclaimer, the term of this patent is extended or adjusted under 35 U.S.C. 154(b) by 0 days.

(21) Appl. No.: 18/161,387

(22) Filed: Jan. 30, 2023

(65) Prior Publication Data

US 2023/0228876 A1    Jul. 20, 2023

Related U.S. Application Data

(63) Continuation of application No. 16/756,408, filed as application No. PCT/US2018/056285 on Oct. 17, 2018, now Pat. No. 11,592,563.
(Continued)

(51) Int. Cl.
    *G01S 17/42*      (2006.01)
    *G01S 7/481*      (2006.01)
    *G02B 26/10*     (2006.01)

(52) U.S. Cl.
    CPC ............ *G01S 17/42* (2013.01); *G01S 7/4817* (2013.01); *G02B 26/105* (2013.01)

(58) Field of Classification Search
    CPC ...... G01S 17/42; G01S 7/4817; G02B 26/105
(Continued)

(56) References Cited

U.S. PATENT DOCUMENTS 3,925,666 A    12/1975   Allan et al.
4,167,329 A    9/1979    Jelalian et al.
(Continued)

FOREIGN PATENT DOCUMENTS

CN    205141361 U    4/2016
FR    2691809 A1    12/1993
(Continued)

OTHER PUBLICATIONS

International Search Report and Written Opinion dated Jan. 29, 2019 for PCT Application No. PCT/US2018/052682, 16 pgs.
(Continued)

*Primary Examiner* — Michael A Lyons
*Assistant Examiner* — Omar H Nixon
(74) *Attorney, Agent, or Firm* — Dorsey & Whitney LLP

(57) ABSTRACT

Embodiments of the disclosure are drawn to apparatuses and methods for a rotating optical reflector. Optical systems may have a limited field of view, and so in order to expand the area that the optical system collects data from, the field of view of the optical system may be scanned across a target area. The present disclosure is directed to a rotating optical reflector, which includes a transmissive layer which refracts light onto a reflective layer, which has a normal which is not parallel to the axis about which the optical reflector is rotated. The optical reflector may be both statically and dynamically balanced, which may allow an increased size of the optical reflector, which in turn may increase the aperture of an optical system (e.g., a lidar system) using the rotating optical reflector.

24 Claims, 5 Drawing Sheets

Related U.S. Application Data

(60) Provisional application No. 62/573,619, filed on Oct. 17, 2017.

(58) Field of Classification Search
USPC .......................................................... 356/4.01
See application file for complete search history.

(56) References Cited

U.S. PATENT DOCUMENTS

| | | | |
|---|---|---|---|
| 4,551,004 A | 11/1985 | Paraskevopoulos | |
| 4,593,368 A | 6/1986 | Fridge et al. | |
| 4,732,156 A | 3/1988 | Nakamura | |
| 4,795,253 A | 1/1989 | Sandridge et al. | |
| 4,830,486 A | 5/1989 | Goodwin | |
| 5,115,468 A | 5/1992 | Asahi et al. | |
| 5,241,366 A * | 8/1993 | Bevis .............. | G01B 11/0625 356/497 |
| 5,294,075 A | 3/1994 | Vertatschitsch et al. | |
| 5,367,399 A | 11/1994 | Kramer | |
| 5,371,587 A | 12/1994 | De Groot et al. | |
| 5,534,993 A | 7/1996 | Ball et al. | |
| 5,548,402 A | 8/1996 | Nogiwa | |
| 5,768,001 A | 6/1998 | Kelley et al. | |
| 5,859,694 A | 1/1999 | Galtier et al. | |
| 5,898,725 A | 4/1999 | Fomenkov et al. | |
| 6,034,976 A | 3/2000 | Mossberg et al. | |
| 6,516,014 B1 | 2/2003 | Sellin et al. | |
| 6,822,742 B1 | 11/2004 | Kalayeh et al. | |
| 6,864,983 B2 | 3/2005 | Galle et al. | |
| 7,215,413 B2 | 5/2007 | Soreide et al. | |
| 7,292,347 B2 | 11/2007 | Tobiason et al. | |
| 7,511,824 B2 | 3/2009 | Sebastian et al. | |
| 7,742,152 B2 | 6/2010 | Hui et al. | |
| 7,920,272 B2 | 4/2011 | Sebastian et al. | |
| 8,010,300 B1 | 8/2011 | Stearns et al. | |
| 8,081,670 B2 | 12/2011 | Belsley | |
| 8,121,798 B2 | 2/2012 | Lippert et al. | |
| 8,175,126 B2 | 5/2012 | Rakuljic et al. | |
| 8,294,899 B2 | 10/2012 | Wong | |
| 8,582,085 B2 | 11/2013 | Sebastian et al. | |
| 8,730,461 B2 | 5/2014 | Andreussi | |
| 8,781,755 B2 | 7/2014 | Wong | |
| 8,913,636 B2 | 12/2014 | Roos et al. | |
| 9,030,670 B2 | 5/2015 | Warden et al. | |
| 9,098,754 B1 | 8/2015 | Stout et al. | |
| 9,559,486 B2 | 1/2017 | Roos et al. | |
| 9,696,423 B2 | 7/2017 | Martin | |
| 9,759,597 B2 | 9/2017 | Wong | |
| 9,784,560 B2 | 10/2017 | Thorpe et al. | |
| 9,864,060 B2 | 1/2018 | Sebastian et al. | |
| 9,970,756 B2 | 5/2018 | Kreitinger et al. | |
| 10,247,538 B2 | 4/2019 | Roos et al. | |
| 10,928,182 B2 | 2/2021 | Roos et al. | |
| 11,105,621 B2 | 8/2021 | Kreitinger et al. | |
| 11,112,308 B2 | 9/2021 | Kreitinger et al. | |
| 11,391,567 B2 | 7/2022 | Thorpe et al. | |
| 11,422,244 B2 | 8/2022 | Thorpe et al. | |
| 11,422,258 B2 | 8/2022 | Thorpe et al. | |
| 11,656,075 B2 | 5/2023 | Kreitinger et al. | |
| 11,692,900 B2 | 7/2023 | Kreitinger et al. | |
| 2002/0071122 A1 | 6/2002 | Kulp et al. | |
| 2003/0043437 A1 | 3/2003 | Stough et al. | |
| 2004/0088113 A1 | 5/2004 | Spoonhower et al. | |
| 2004/0105087 A1 | 6/2004 | Gogolla et al. | |
| 2005/0078296 A1 | 4/2005 | Bonnet | |
| 2005/0094149 A1 | 5/2005 | Cannon | |
| 2006/0050270 A1 | 3/2006 | Elman | |
| 2006/0162428 A1 | 7/2006 | Hu et al. | |
| 2006/0203224 A1 | 9/2006 | Sebastian et al. | |
| 2008/0018881 A1 | 1/2008 | Hui et al. | |
| 2008/0018901 A1 | 1/2008 | Groot | |
| 2009/0046295 A1 | 2/2009 | Kemp et al. | |
| 2009/0110004 A1 | 4/2009 | Chou et al. | |
| 2009/0153872 A1 | 6/2009 | Sebastian et al. | |
| 2009/0257622 A1 | 10/2009 | Wolowelsky et al. | |
| 2010/0007547 A1 | 1/2010 | D'Addio | |
| 2010/0091278 A1 | 4/2010 | Liu et al. | |
| 2010/0131207 A1 | 5/2010 | Lippert et al. | |
| 2010/0141261 A1 | 6/2010 | Overby et al. | |
| 2011/0069309 A1 | 3/2011 | Newbury et al. | |
| 2011/0164783 A1 | 7/2011 | Hays et al. | |
| 2011/0188029 A1 | 8/2011 | Schmitt et al. | |
| 2011/0205523 A1 | 8/2011 | Rezk et al. | |
| 2011/0213554 A1 | 9/2011 | Archibald et al. | |
| 2011/0273699 A1 | 11/2011 | Sebastian et al. | |
| 2011/0292403 A1 | 12/2011 | Jensen et al. | |
| 2012/0038930 A1 | 2/2012 | Sesko et al. | |
| 2012/0106579 A1 | 5/2012 | Roos et al. | |
| 2012/0274938 A1 | 11/2012 | Ray | |
| 2012/0293358 A1 | 11/2012 | Itoh | |
| 2013/0104661 A1 | 5/2013 | Klotz et al. | |
| 2013/0162976 A1 | 6/2013 | Dakin et al. | |
| 2014/0002639 A1 | 1/2014 | Cheben et al. | |
| 2014/0036252 A1 | 2/2014 | Amzajerdian et al. | |
| 2014/0139818 A1 | 5/2014 | Sebastian et al. | |
| 2014/0204363 A1 | 7/2014 | Slotwinski et al. | |
| 2015/0019160 A1 | 1/2015 | Thurner et al. | |
| 2015/0059444 A1 | 3/2015 | Rella | |
| 2015/0185313 A1 | 7/2015 | Zhu | |
| 2015/0355327 A1 | 12/2015 | Goodwin et al. | |
| 2016/0033643 A1 | 2/2016 | Zweigle et al. | |
| 2016/0123718 A1 | 5/2016 | Roos et al. | |
| 2016/0123720 A1 | 5/2016 | Thorpe et al. | |
| 2016/0131514 A1 | 5/2016 | Babin et al. | |
| 2016/0202225 A1 | 7/2016 | Feng et al. | |
| 2016/0259038 A1 | 9/2016 | Retterath et al. | |
| 2016/0261091 A1 | 9/2016 | Santis et al. | |
| 2016/0329681 A1 | 11/2016 | Tulip | |
| 2017/0089829 A1 | 3/2017 | Bartholomew | |
| 2017/0097274 A1 | 4/2017 | Thorpe et al. | |
| 2017/0097302 A1 | 4/2017 | Kreitinger et al. | |
| 2017/0115218 A1 | 4/2017 | Huang et al. | |
| 2017/0131394 A1 | 5/2017 | Roger et al. | |
| 2017/0146335 A1 | 5/2017 | Martinez et al. | |
| 2017/0146639 A1 * | 5/2017 | Carothers ............... | G01S 17/02 |
| 2017/0168161 A1 | 6/2017 | Shapira et al. | |
| 2017/0171397 A1 | 6/2017 | Mitsumori et al. | |
| 2017/0191898 A1 | 7/2017 | Rella et al. | |
| 2017/0343333 A1 | 11/2017 | Thorpe et al. | |
| 2018/0188369 A1 | 7/2018 | Sebastian et al. | |
| 2018/0216932 A1 | 8/2018 | Kreitinger et al. | |
| 2018/0224548 A1 | 8/2018 | Hariyama et al. | |
| 2019/0013862 A1 | 1/2019 | He et al. | |
| 2019/0086517 A1 | 3/2019 | Puglia et al. | |
| 2019/0170500 A1 | 6/2019 | Roos et al. | |
| 2019/0285409 A1 | 9/2019 | Kreitinger et al. | |
| 2019/0383596 A1 | 12/2019 | Thorpe et al. | |
| 2020/0011994 A1 | 1/2020 | Thorpe et al. | |
| 2020/0149883 A1 | 5/2020 | Thorpe et al. | |
| 2020/0182978 A1 | 6/2020 | Maleki et al. | |
| 2020/0241139 A1 | 7/2020 | Roos et al. | |
| 2020/0278432 A1 | 9/2020 | Thorpe et al. | |
| 2020/0355552 A1 | 11/2020 | Kreitinger et al. | |
| 2021/0055180 A1 | 2/2021 | Thorpe et al. | |
| 2021/0190953 A1 | 6/2021 | Roos et al. | |
| 2021/0293960 A1 | 9/2021 | Kreitinger et al. | |
| 2022/0034718 A1 | 2/2022 | Kreitinger et al. | |
| 2022/0057202 A1 | 2/2022 | Kreitinger et al. | |
| 2022/0412732 A1 | 12/2022 | Thorpe et al. | |
| 2023/0243648 A1 | 8/2023 | Kreitinger et al. | |
| 2023/0314266 A1 | 10/2023 | Kreitinger et al. | |

FOREIGN PATENT DOCUMENTS

| | | |
|---|---|---|
| JP | H0886650 A * | 5/1996 |
| WO | 2010127151 A2 | 11/2010 |
| WO | 2014088650 A1 | 6/2014 |
| WO | 2016064897 A1 | 4/2016 |
| WO | 2017187510 A1 | 11/2017 |
| WO | 2018067158 A1 | 4/2018 |
| WO | 2018170478 A1 | 9/2018 |
| WO | 2019060901 A1 | 3/2019 |

(56) References Cited

FOREIGN PATENT DOCUMENTS

| WO | 2019070751 A1 | 4/2019 |
|---|---|---|
| WO | 2019079448 A1 | 4/2019 |
| WO | 2019099567 | 5/2019 |

OTHER PUBLICATIONS

International Search Report and Written Opinion dated Mar. 15, 2019 for PCT Application No. PCT/US2018/061120; 17 pgs.
International Search Report and Written Opinion dated Nov. 30, 2018 for PCT Application No. PCT/US2018/054016, 18 pages.
International Search Report and Written Opinion for Application No. PCT/US2019/042422, dated Oct. 24, 2019.
International Search Report dated Feb. 16, 2016, for International Application No. PCT/US2015/057814, pp. all.
International Search Report dated Jan. 19, 2016 for International Application No. PCT/US2015/058051.
International Search Report and Written Opinion for PCT Application No. PCT/US2018/056285 dated Dec. 20, 2018, pp. all.
International Search Report and Written Opinion received for PCT/US2015/057814 dated Feb. 16, 2016, pp, all.
International Search Report and Written Opinion received for PCT/US2015/058051 dated Jan. 19, 2016, pp, all.
Amann, et al., ""Laser ranging: a critical review of usual techniques for distance measurement," Optical Engineering, vol. 40(1) pp. 10-19 (Jan. 2001)".
Barber, et al., ""Accuracy of Active Chirp Linearization for Broadband Frequency Modulated Continuous Wave Ladar," Applied Optics, vol. 49, No. 2, pp. 213-219 (Jan. 2010)".
Barker, , ""Performance enhancement of intensity-modulated laser rangefinders on natural surfaces"", SPIE vol. 5606, pp. 161-168 (Dec. 2004).
Baumann, et al., ""Speckle Phase Noise in Coherent Laser Ranging: Fundamental Precision Limitations," Optical Letters, vol. 39, Issue 16, pp. 4776-4779 (Aug. 2014)".
Boashash, ""Estimating and Interpreting the Instantaneous Frequency of a Signal-Part 2: Algorithms and Applications"", Proceedings of the IEEE, vol. 80, No. 4, pp. 540-568 (Apr. 1992).
Bomse, et al., ""Frequency modulation and wavelength modulation spectroscopies: comparison of experimental methods using a lead-salt diode laser"", Appl. Opt., 31, pp. 718-731 (Feb. 1992).
Cao, et al., "Etalon Eifects Analysis in Tunable Diode Laser Absorption Spectroscopy Gas Concentration Detection System Based on Wavelength Modulation Spectroscopy", 2010 Symposium on Photonics and Optoelectronics, 2010, pp. 1-5.
Choma, et al., "Sensitivity Advantage of Swept Source and Fourier Domain Optical Coherence Tomography," Optical Express, vol. 11, No. 18, 2183 (Sep. 2003).
Ciurylo, "Shapes of pressure- and Doppler-broadened spectral lines in the core and near wings", Physical Review A, vol. 58 No. 2, pp. 1029-1039 (Aug. 1998).
Dharamsi, "A theory of modulation spectroscopy with applications of higher harmonic detection", J. Phys. D: Appl. Phys 29, pp. 540-549 (Jun. 1995;1996) (Retrieved Jan. 16, 2017).
Emran, Bara J. et al., "Low-Altitude Aerial Methane Concentration Mapping", School of Engineering, The University of British Columbia, (Aug. 10, 2017), pp. 1-12.
Fehr, et al., ""Compact Covariance Descriptors in 3D Point Clouds for Object Recognition"", 2012 IEEE International Conference on Robotics and Automation, pp. 1793-1798, (May 2012).
Fransson, Karin et al., "Measurements of VOCs at Refineries Using the Solar Occultation Flux Technique", Department of Radio and Space Science, Chalmers University of Technology, 2002, 1-19.
Fujima, et al., ""High-resolution distance meter using optical intensity modulation at 28 GHz"", Meas. Sci. Technol. 9, pp. 1049-1052 (May 1998).
Gilbert, et al., ""Hydrogen Cyanide H13C14N Absorption Reference for 1530 nm to 1565 nm Wavelength Calibration—SRM 2519a"", NIST Special Publication 260-137 2005 ED, 29 pages, (Aug. 2005).
Guest, ""Numerical Methods of Curve Fitting"", Cambridge University Press; Reprint edition, ISBN: 9781107646957 (Dec. 2012).
Iiyama, et al., "Linearizing Optical Frequency-Sweep of a Laser Diode for FMCW Reflectrometry", Iiyama et al. Journal of Lightwave Technology, vol. 14, No. 2, (Feb. 1996).
Jia-Nian, et al., ""Etalon effects analysis in tunable diode laser absorption spectroscopy gas concentration detection system based on wavelength modulation spectroscopy"", IEEE SOPO, pp. 1-5 (Jul. 2010).
Johnson, et al., ""Using Spin-Images for Efficient Object Recognition in Cluttered 3D Scenes"", IEEE Transactions on Pattern Analysis and Machine Intelligence, vol. 21, No. 5, 37 pages (Published May 1999).
Karlsson, et al., "Linearization of the frequencysweep of a frequency-modulated continuous-wave semiconductor laser radar and the resulting ranging performance", Christer J. Karlsson et al., Applied Optics, vol. 38, No. 15, (May 20, 1999), pp. 3376-3386.
Karmacharya, et al., ""Knowledge guided object detection and indentification in 3D point clouds"", SPIE 9528, 952804-952804-13 (Jun. 2015).
Lenz, Dawn et al., "Flight Testing of an Advanced Airborne Natural Gas Leak Detection System", ITT Industries Space Systems Division, (Oct. 2005).
Lu, et al., "Differential wavelength-scanning heterodyne interferometer for measuring large step height", Applied Optics, vol. 41, No. 28, (Oct. 1, 2002).
Masiyano, et al., ""Use of diffuse reflections in tunable diode laser absorption spectroscopy: implications of laser speckle for gas absorption measurements"", Appl. Phys. B 90, pp. 279-288 (Feb. 2008).
Mather, T.A. et al., "A reassessment of current volcanic emissions from the Central American arc with specific examples from Nicaragua", Journal of Volcanology and Geothermal Research, (Nov. 2004), 297-311.
Ngo, et al., ""An isolated line-shape model to go beyond the Voigt profile in spectroscopic databases and radiative transfer codes"", Journal of Quantitative Spectroscopy and Radiative Transfer, 129, pp. 89-100 (Nov. 2013).
Olsovsky, et al., ""Chromatic Confocal Microscopy for Multi-depth Imaging of Epithelial Tissue," Biomedical Optics Express, vol. 4, No. 5, pp. 732-740 (May 2013)".
Paffenholz, , ""Direct geo-referencing of 3D point clouds with 3D positioning sensors"", (Doctoral Thesis), Leibniz Universität Hannover, 138 pages (Sep. 2012).
Polyanksy, et al., ""High-Accuracy CO2 Line Intensities Determined from Theory and Experiment"", Physical Review Letters, 114, 5 pages (Jun. 2015).
Rao, ""Information and the accuracy attainable in the estimatin of statistical parameters"", Bull. Calcutta Math. Soc., 37,pp. 81-89 (1945, reprinted 1992) (Retrieved Jan. 10, 2017).
Riris, et al., ""Airborne measurements of atmospheric methane column abundance using a pulsed integrated-path differential absorption lidar"", Applied Optics, vol. 51, No. 34, pp. 8296-8305 (Dec. 2012).
Rothman, et al., ""The HITRAN 2008 molecular spectroscopic database"", Journal of Quantitative Spectroscopy & Radiative Transfer, 110, pp. 533-572 (Jul. 2009).
Rusu, et al., ""Fast Point Feature Histograms (FPFH) for 3D Registration"", IEEE Int. Conf. Robot., pp. 3212-3217 (May 2009).
Sandsten, et al., ""Volume flow calculations on gas leaks imaged with infrared gas-correlation"", Optics Express, vol. 20, No. 18, pp. 20318-20329 (Aug. 2012).
Silver, , ""Frequency-modulation spectroscopy for trace species detection: theory and comparison among experimental methods"", Appl. Opt., vol. 31 No. 6, pp. 707-717 (Feb. 1992).
Sirat, et al., ""Conoscopic Holography," Optics Letters, vol. 10, No. 1 (Jan. 1985)".
Sivananthan, , Integrated Linewidth Reduction of Rapidly Tunable Semiconductor Lasers Sivananthan, Abirami, Ph.D., University of California, Santa Barbara, 2013, 206; 3602218.
Stone, et al., ""Performance Analysis of Next-Generation LADAR for Manufacturing, Construction, and Mobility," NISTIR 7117 (May 2004)".

(56) References Cited

OTHER PUBLICATIONS

Thoma, Eben D. et al., "Open-Path Tunable Diode Laser Absorption Spectroscopy for Acquisition of Fugitive Emission Flux Data", Journal of the Air & Waste Management Association (vol. 55), (Mar. 1, 2012) 658-668.

Twynstra, et al., ""Laser-absorption tomography beam arrangement optimization using resolution matrices"", Applied Optics, vol. 51, No. 29, pp. 7059-7068 (Oct. 2012).

Xi, et al., "Generic real-time uniorm K-space sampling method for high-speed swept—Source optical cohernece tomography", Optics Express, vol. 18, No. 9, pp. 9511-9517 (Apr. 2010).

Zakrevskyy, et al., ""Quantitative calibration- and reference-free wavelength modulation spectroscopy"", Infrared Physics & Technology, 55, pp. 183-190 (Mar. 2012).

Zhao, et al., ""Calibration-free wavelength-modulation spectroscopy based on a swiftly determined wavelength-modulation frequency response function of a DFB laser"", Opt. Exp., vol. 24 No. 2, pp. 1723-1733 (Jan. 2016).

Zhao, Yanzeng et al., "Lidar Measurement of Ammonia Concentrations and Fluxes in a Plume from a Point Source", Cooperative Institute for Research in Environmental Studies, University of Colorado/NOAA (vol. 19), (Jan. 2002), 1928-1938.

Wilson, J.D., et al., "Ground-to-air Gas Emission Rate Inferred from Measured Concentration Rise within a Disturbed Atmospheric Surface Layer" Journal of Applied Meteorology and Climatology, vol. 49, pp. 1818-1830, Sep. 2010.

\* cited by examiner

APPARATUSES AND METHODS FOR A ROTATING OPTICAL REFLECTOR

CROSS-REFERENCE TO RELATED APPLICATION(S)

This application is a continuation application of U.S. patent application Ser. No. 16/756,408, filed Apr. 15, 2020, which is a 35 U.S.C. § 371 National Stage Application of PCT Application No. PCT/US2018/056285, filed Oct. 17, 2018, which claims the benefit under 35 U.S.C. § 119 of the earlier filing date of U.S. Provisional Application Ser. No. 62/573,619 filed Oct. 17, 2017, the entire contents of which are hereby incorporated by reference, in their entirety, for any purposes.

BACKGROUND

Optical beam scanners can be critical components of state-of-the-art light detection and ranging (lidar) systems. Depending on the application there may be several classes of scanner technology to choose from including rotating polygon mirrors, galvanometer-mounted mirrors, Risley prisms, MEMS, liquid crystal waveguides and phased arrays. Each technology may have unique strengths and weakness that may determine its efficacy for specific lidar applications. While many of these scanner types have been developed to provide wide field-of-view and rapid beam scanning for small optical apertures, less attention has be paid to advancing compact systems for scanning large aperture beams.

Rapid spatial scanning of a relatively large optical aperture may be useful for gas sensing lidar systems. For instance, a differential absorption lidar (DIAL) beam scanner may use an optical aperture diameter that is many times larger than that of a 3D terrain-mapping lidar operating at a similar target distance. The size of the aperture may be even larger for lidar systems based on wavelength modulation spectroscopy (WMS) because continuous-wave, instead of pulsed, laser beams may be used. In many cases the larger aperture of WMS lidar can be offset by lower cost and complexity of associated laser systems and the improved measurement performance that can be achieved using WMS provided there is a good option for scanning the larger beam aperture.

Some gas-sensing lidar systems use one or more transmissive Risley-style prisms for spatial beam scanning. Risley prism scanners may currently achieve 4 inch optical apertures, 120 degree field of view and scan speeds exceeding 1000 RPM in a 3000 cubic centimeter package that weighs around 6 kg.

SUMMARY

In at least one aspect, the present disclosure may relate to an apparatus, which may include an optical reflector and a motor. The optical reflector may include a transmissive surface and a reflective surface. The transmissive surface may be positioned to refract incident light toward the reflective surface. The motor may rotate the optical reflector about an axis of rotation, such that a normal to the reflective surface is not parallel with the axis of rotation.

In another aspect, the present disclosure may relate to a system, which may include a mobile platform, a transmitter, an optical reflector, a motor, a receiver, and a processor. The mobile platform may move relative to a target area, which may include a gas. The transmitter may selectively emit transmitted light. The optical reflector may be positioned to receive incident light, which may include at least a portion of the transmitted light. The optical reflector may refract the incident light through a transmissive surface to provide refracted light, reflect the refracted light from a reflective surface to provide reflected light, and refract the reflected light through the transmissive surface to provide scanning light. The motor may rotate the optical reflector about an axis of rotation, wherein the axis of rotation forms an angle other than parallel to a normal of the reflective surface. The rotation of the optical reflector and the motion of the mobile platform may scan the scanning light across the target area. The receiver may receive received light which may be provided from the target area. For this, and other aspects of the present disclosure, a receiver and a transmitter may comprise common components (e.g. a monostatic transceiver). The processor may determine a concentration of the gas based on the received light.

In another aspect, the present disclosure may relate to a method. The method may include directing incident light from a transmitter at an optical reflector which may include a transmissive surface and a reflective surface. The transmissive surface may be positioned to refract the incident light toward the reflective surface, and the optical reflector may provide scanning light based on the incident light. The method may also include rotating the optical reflector about an axis of rotation, wherein a normal to the reflective surface is not parallel to the axis of rotation. The method may also include scanning the scanning light across a target area based on the rotation of the optical reflector. The method may also include reflecting received light provided from the target area across the optical reflector and towards a receiver.

In another aspect, the present disclosure may relate to a method. The method may include moving a mobile platform relative to a target area which may include a gas. The method may also include scanning light about the target area based, at least in part, on the rotation of an optical reflector. The optical reflector may include a transmissive surface which may direct incident light onto a reflective surface. The optical reflector may be rotated about an axis of rotation which is not parallel to a normal of the reflective surface. The method may also include determining a concentration of the gas based on a received portion of the scanning light. The method may also include determining a spatial distribution of the concentration of the gas based, at least in part, on moving the mobile platform and scanning the light.

DETAILED DESCRIPTION

Figure 1:
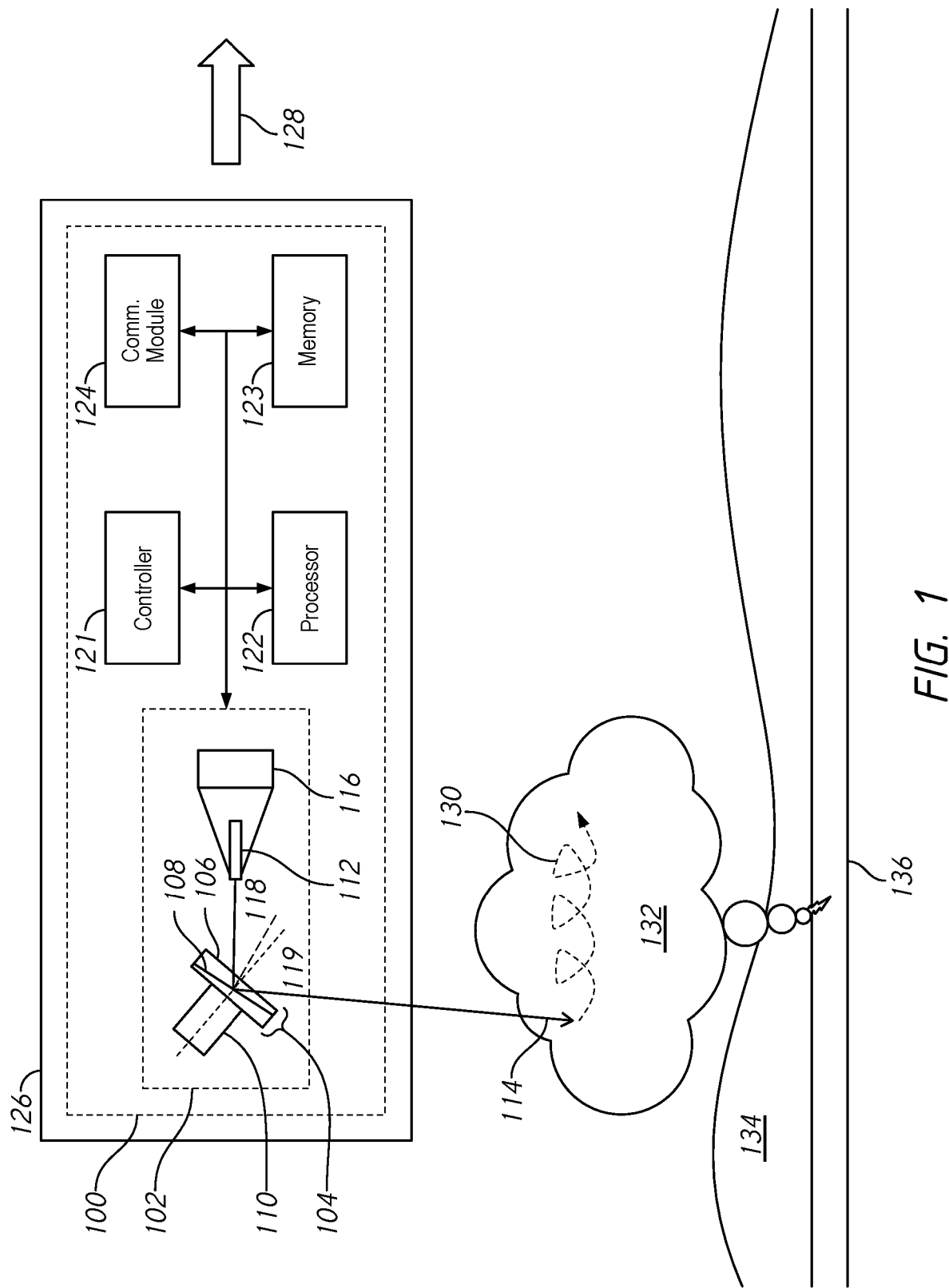
FIG. 1 is a block diagram of a measurement system according to an embodiment of the present disclosure.

The following description of certain embodiments is merely exemplary in nature and is in no way intended to limit the scope of the disclosure or its applications or uses.

In the following detailed description of embodiments of the present systems and methods, reference is made to the accompanying drawings which form a part hereof, and which are shown by way of illustration specific embodiments in which the described systems and methods may be practiced. These embodiments are described in sufficient detail to enable those skilled in the art to practice presently disclosed systems and methods, and it is to be understood that other embodiments may be utilized and that structural and logical changes may be made without departing from the spirit and scope of the disclosure. Moreover, for the purpose of clarity, detailed descriptions of certain features will not be discussed when they would be apparent to those with skill in the art so as not to obscure the description of embodiments of the disclosure. The following detailed description is therefore not to be taken in a limiting sense, and the scope of the disclosure is defined only by the appended claims.

Spectroscopy may be used in a wide array of applications to determine properties of a target based on the interaction of different wavelengths of electromagnetic radiation with the target. An optical system may direct light from a transmitter (e.g., a light source, a telescope, etc.) onto the target, and/or may direct light from the target (e.g., reflected and/or scattered light) onto a receiver (e.g., a camera, a telescope, etc.). The optical system may have a field of view, which may limit the size of area from which the optical system can collect light. It may be desirable to increase the size of area which can be interrogated by the optical system.

In order to increase the area over which the optical system collects measurements, the light from the optical system and/or the 'view' of the receiver may be scanned or swept across an area. The scanned or swept area 'seen' by the optical system may be a field of regard, which includes a number of individual fields of view. Optical beam scanners may be optical elements which deflect a light beam (e.g. in a regular pattern) over time. The optical beam scanner may be used to scan the beam cross the target area. To further increase the area measured by the optical system, the optical system may be mounted in a mobile platform (e.g., a vehicle) which may move relative to a target area while the light beam is being swept or scanned in order to create a scan path. By taking multiple measurements as the beam is scanned along the scan path, the optical system may be able to generate measurements from a wide angle.

In order to scan a sufficiently large area, it may be necessary for the angle at which the light beam is deflected to change rapidly. This may require one or more elements of the optical scanner to move rapidly. At the same time, it may be desirable to increase an area of one or more of the components of the optical system to, for example, increase an amount of light collected by the optical system. It may be difficult to have components which exhibit both large area and rapid motion unless the components achieve static and/or dynamic balance.

The present disclosure is directed to a rotating optical reflector. The optical reflector includes an optically transmissive material with a transmissive surface and a reflective surface. Light may refract when entering the transmissive surface, reflect from the reflective surface and refract again when exiting the transmissive material through the transmissive surface. The transmissive surface and the reflective surface may be non-parallel to each other, and may therefore form a wedge with a wedge angle. The angle that the light is deflected passing through the transmissive material may be based, at least in part, on an angle of the incident light relative to a normal of the transmissive surface. The angle that the refracted light is reflected by the reflective surface may be based, at least in part, on an angle of the refracted light relative to a normal to the reflective surface. The optical reflector may be coupled to a motor, which may rotate the optical reflector about an axis of rotation. The normal of the reflective surface may be non-parallel to the axis of rotation, and thus the direction in which the light is deflected by the optical reflector may change as the scanner rotates.

The optical reflector may be shaped (and/or weighted) such that an inertial axis of the optical reflector is coincident with the axis of rotation. This may allow the optical reflector to achieve (and/or come close to) static and/or dynamic balance. This may reduce forces acting on the optical system due to the rotation, which may, for example, allow for a larger surface area of the optical reflector (e.g., a larger aperture), and/or more compact motors, housings, etc., and/or longer component lifetime before maintenance or repair.

In some embodiments, the optical reflector may include a second piece of material which may be coupled to the optically transmissive material in order to form a shape with rotational symmetry (e.g., a cylinder). The second material may be the same material as the optically transmissive material, or may be a different material. In some embodiments, the first and second material may have a same wedge angle and/or the same shape as the first material, and may be coupled together along the reflective surface.

For brevity, the operation of the optical reflector will generally be described with respect to light being emitted by the optical system and scanned across a target area due to the rotation of the optical reflector. However, one of skill in the art would appreciate that since optical paths may typically be reversible, the optical reflector may also work in a similar manner to scan a field of view 'seen' by the optical system (e.g., reach a receiver of the optical system). In some embodiments, the optical reflector may be in the path of the emitted light, the received light, or combinations thereof. It should also be understood that while particular embodiments are disclosed implementing the optical reflector on a particular optical system, the optical reflector may be used in any optical system.

Certain materials may be described based on their interaction with light (e.g., opaque, reflective, transmissive, etc.). These descriptors may refer to that material's interactions with a range of wavelength(s) emitted by the system and/or that the receiver is sensitive to. It would be understood by one of skill in the art that a given material's properties vary at different ranges of wavelengths and that different materials may be desired for different expected ranges of wavelength(s). The description of a particular example material is not intended to limit the disclosure to a range of wavelengths over which that particular example material has the desired optical properties. The term 'light' may be used throughout the spectrum to represent electromagnetic radiation, and is not intended to limit the disclosure to electromagnetic radiation within the visible spectrum. The term 'light' may refer to electromagnetic radiation of any wavelength.

FIG. 1 is a block diagram of a measurement system according to an embodiment of the present disclosure. The measurement system 100 includes a scanning system 102, which includes an optical reflector 104. The optical reflector 104 includes a transmissive surface 106 and a reflective surface 108 which has a normal 118. The scanning system 102 also includes a motor 110 which rotates the optical reflector about an axis of rotation 119, a transmitter 112 and a receiver 116. The measurement system 100 also includes a controller 121, a processor 122, a memory 123 and a communications module 124. All or part of the measurement system 100 may be mounted on a mobile platform 126, which may have a direction of motion 128 relative to a target area 134. The measurement system 100 may direct light towards a target area 134 and/or receive light from a target area 134, which may be represented by example light ray 114. The example light ray 114 may follow a scan path 130. The target area 134 may include a target of interest, such as gas 132, which may be emitted from a source 136.

The direction of motion 128 and the rotation of the optical reflector 104 may, at least in part, direct the emitted light and/or field of view of the scanning system 102 (as represented by example light ray 114) to be swept or scanned along a scan path 130. This may allow collection of data from a larger region (e.g., a field of regard) than would be possible if the scanning system 102 and/or the example light ray 114 were stationary with respect to the target area 134. The measurement system 100 may collect measurements as the example light ray 114 is scanned across the target area 134, and may determine one or more properties, such as concentration, of targets (e.g., gas 132) within the target area 134. In some embodiments, the measurement system 100 may be a light detection and ranging (lidar) system. In some embodiments, the measurement system 100 may be a spectroscopic system (e.g., wavelength modulation spectroscopy) and one or more properties of the target 132 may be determined based, at least in part, on spectroscopic measurements. In some embodiments, additional components (e.g., lenses, filters, beam splitters, etc.) may be provided in the scanning system 102 to redirect and/or change other properties of the light.

The scanning system 102 may provide scanning light and may receive received light from the target area 134. The scanning light may be represented by the light ray 114. The scanning system 102 may direct the light ray 114 along a scan path 130, which may be a closed path when the scanning system 102 is stationary relative to the target area 134 (e.g., when the mobile platform 126 is not in motion). The transmitter 112 may provide incident light (e.g., transmitted light), which may interact with (e.g., be redirected by) the optical reflector 104 to provide the scanning light. The rotation of the optical reflector 104 about an axis of rotation 119 by the motor 110 may cause the scanning light redirected by the optical reflector 104 to move relative to a target area 134 (e.g., by changing a direction or an angle at which the scanned light 114 is deflected by the optical reflector 104).

The scanning system 102 includes a transmitter 112, which may produce transmitted light. A portion of the transmitted light (which, in some embodiments may be substantially all of the transmitted light) may reach the optical reflector 104 as incident light. In some embodiments, the transmitter 112 may produce a broad spectrum of light across a range of wavelengths. In some embodiments, the transmitter 112 may produce the transmitted light with a particular spectrum (e.g., a narrow bandwidth centered on a selected wavelength). In some embodiments, the transmitter 112 may be a laser, and the transmitted light may generally be coherent. In some embodiments, the controller 121 may cause the spectrum of the transmitted light to change over time. In some embodiments, the wavelength of the transmitted light may be modulated for wavelength modulation spectroscopy (WMS). In some embodiments, may be modulated for frequency-modulated, continuous-wave (FMCW) LiDAR.

The optical reflector 104 may redirect all or a portion of the incident light towards the target area 134 as scanning light. The incident light (which may be all, or a portion of, the transmitted light from the transmitter 112) may be directed at a transmissive surface 106, which may refract the incident light as refracted light (e.g., when the incident light enters the material of the optical reflector 104) and direct the refracted light onto a reflective surface 108. The refracted light may be reflected into reflected light by the reflective surface 108. The direction of the reflected light may be based, at least in part, on an angle between the refracted light and a normal 118 to the reflective surface 108. The reflected light may refract a second time when crossing the transmissive surface 106 again (e.g., when exiting the material of the optical reflector 104), to become the scanning light 114.

The optical reflector 104 may be coupled to a motor 110, which may rotate the optical reflector 104 about a rotational axis 119. The motor 110 may be any means capable of rotating the optical reflector 104. In some embodiments, the motor 110 may be an electric motor, which may be coupled to the controller 121. Other means of rotating the optical reflector 104 may be used as the motor 110 in other embodiments. Although the example of FIG. 1 shows the motor 110 coupled to a back of the optical reflector 104 (e.g., opposite the transmissive surface 106), it should be understood that the motor 110 may be coupled to any part of the optical reflector 104, as long as the coupling allows the motor 110 to rotate the optical reflector 104 about the rotational axis 119.

The optical reflector 104 may be balanced (statically and/or dynamically) such that an inertial axis of the optical reflector 104 is coincident with the rotational axis 119. The rotational axis 119 is not parallel to the normal 118 of the reflective surface 108 (e.g., the normal 118 and the rotational axis 119 have an angle between them which is greater than 0°). Accordingly, as the optical reflector 104 rotates about the rotational axis 119, the direction or angle of the reflected light (and thus the direction or angle of the scanning light 114) changes, at least in part, due to its dependence on the angle of the normal 118 to the reflective surface 108.

The scanning system 102 may also receive light from the target area 134. The received light may be thought of as a bundle of light rays (e.g., light ray 114) which are redirected by the optical reflector 104 to the receiver 116. The size of the area from which light rays reach the receiver 116, and the amount of light which reaches the receiver 116, may be dependent on the field of view of the scanning system 100.

In some embodiments, the optical reflector 104 may be the limiting aperture of the scanning system, such that substantially all light rays which intersect the reflective surface 108 are redirected onto the receiver. In other embodiments, a different component (e.g., the receiver 116) may be the limiting aperture of the scanning system 102. The light rays which reach the receiver 116 may come from a particular portion of the target area 134. The rotation of the optical reflector 104 by the motor 110 may change the portion of the target area 134 that the receiver 116 is 'seeing'. The area 'seen' by the receiver 134 may follow generally the same scan path 130 as the scanning light 114.

In some embodiments, the transmitter 112 and the receiver 116 may be packaged together into a single unit. In some embodiments, the transmitter 112 and the receiver 116 may be coaxial with each other. In some embodiments, a single transceiver may be used as both the transmitter 112 and the receiver 116 (e.g. monostatic transceiver).

The scanning system 102 may be mounted on (e.g., supported by) a mobile platform 126, which may move along a direction of motion 128 relative to the target area 134. In some embodiments, the mobile platform 126 may be an aerial vehicle. The mobile platform may be manned (e.g., an airplane, a helicopter) or unmanned (e.g., a drone). In some embodiments, the unmanned vehicle may operate based on remote instructions from a ground station and/or may operate based on internal logic (e.g., on autopilot).

The motion of the scanning system 102 along the direction of motion 128 along with the changing angle of the scanning beam 114 (and area 'seen' by the receiver 116) with respect to the optical reflector 104 due to the rotation of the optical reflector 104 may cause the scanning beam 114 to follow a scan path 130. The scan path 130 may be generally have a repeating shape (e.g., a helical shape). In some embodiments, without the direction of motion 128 of the mobile platform 126, the scanning light 114 may follow a closed path, such as a circle or an ellipse. The motion of the mobile platform 126 may extend the closed path into the scan path 130.

In some embodiments, the optical reflector 104 may be coupled to a second motor (not shown) which may steer or move the optical reflector 104 while it is being rotated by the motor 110. The transmitter 112 and/or receiver 116 may also be coupled to the second motor, such that they maintain their relationship to the optical reflector 104 while it is in motion. The motion of the optical reflector 104 along one or more axes by the second motor may also scan the field of view along the scan path 130, without the need for a mobile platform.

The scanning light 114 may interact with one or more targets 132 within the target area 134. In some embodiments, the target 132 may redirect (e.g., by scattering, reflection, etc.) a portion of the scanning light back along an optical path leading to the receiver 116. In some embodiments, the scanning light may interact with the target 132 (e.g., via absorption) and then be redirected along an optical path back towards the receiver 116 by one or more other features of the target area 134 (e.g., the ground). In some embodiments, the target 132 may both redirect the scanning light 114 and also modify the scanning light (e.g., may absorb, scatter, transmit, and/or reflect the scanning light 114).

A portion of the scanning light 114 may return to the receiver 116 after interacting with the target 132 as received light. The processor 122 may use one or more aspects (e.g., wavelength, intensity) of the received light to determine one or more properties (e.g., concentration, content, etc.) of the target 132. In some embodiments, the processor 122 may compare one or more aspects of the emitted light provided by the transmitter 112 to corresponding aspects of the received light. In some embodiments, the processor 122 may direct the controller 121 to modulate the wavelength of the emitted light provided by the transmitter 112, and the processor 122 may determine properties of the target 132 based on wavelength modulation spectroscopy.

In some embodiments, the processor 122 may determine a spatial distribution of the concentration of the target 132. The concentration of the target 132 may be determined based on individual measurements which may be swept along the scan path 130. The processor 122 may measure a spatial location of a given measurement (e.g., based on mapping of the target area 134) and/or may determine the spatial location based on known location parameters (e.g., based on known properties of the direction of motion 128 and/or scan path 130). In some embodiments, the measurement system 100 may include a location determination system (e.g., a GPS, an inertial navigation system, a range-finding system, etc.) to aid in determining the spatial distribution. The individual measurements may then be combined with the spatial information to generate the spatial distribution. The spatial information may be 2D and/or 3D.

The measurements and/or information derived from the measurements (e.g., a spatial distribution of the measurement) along with other information (e.g., an altitude of the mobile platform 126, a rate of rotation of the optical reflector 104, etc.) may be provided to the memory 123 and/or communications module 124. The memory 123 may be used to record information and/or store instructions which may be executed by the processor 122 and/or controller 121 to perform the measurements. The communications module 124 may be a wireless communication module (e.g., radio, Bluetooth, WiFi, etc.) which may be used to transmit information to one or more remote stations and/or to receive instructions from the remote stations.

In some embodiments, one or more components of the measurement system 100 may be located off of the mobile platform 126. For example, the memory 123 and/or the processor 122 may be located at a remote station (e.g., a ground station) and may receive information/instructions from and/or provide information/instructions to the scanning system 102 via the communications module 124. Different arrangements or parts of the measurement system 100 between the mobile platform 126 and one or more remote stations are possible in other examples. Although not shown in FIG. 1, in some embodiments one or more additional components may be provided in the measurement system 100 (either in the mobile platform 126 or at a remote location communicatively coupled to the other components) such as a user interface, display, etc.

The information gathered by the measurement system 100 may be used to determine one or more properties of a target 132. In some embodiments the target 132 may be a gas, such as methane. In some embodiments, the target area may include a wellsite, a pipeline, a landfill, a waste water facility, a feedlot, an industrial site, a waste disposal site, or combinations thereof. The spatial distribution of concentrations of the gas target 132 about the target area 134 may be used, for example, to locate a source 136 (e.g., a leak) of the gas target 132. In some embodiments, one or more actions may be taken based on the measurements and/or spatial distribution such as, for example, evacuating an area, measuring an environmental hazard, locating a gas leak, determining a possible repair, ensuring regulatory compliance, or combinations thereof. Other actions may be taken in other embodiments.

In one example embodiment, the scanning system 102 may have a 6.5 inch (165.1 mm) optical aperture, a 20° field of regard, a rate of rotation of the optical reflector 104 of 3000 RPM, a weight of 6 kg, and a volume of 2000 $cm^3$.

Figure 2:
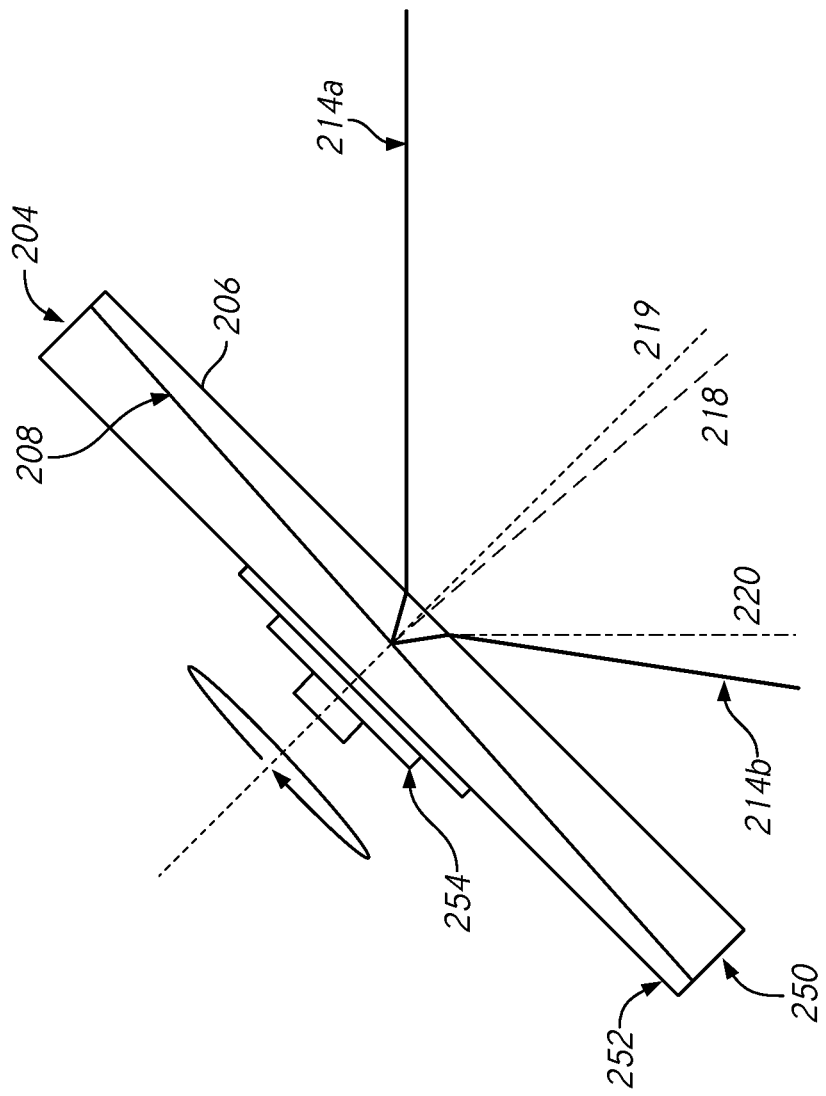
FIG. 2 is a block diagram, in cross-section, of a rotating optical reflector according to an embodiment of the present disclosure.

FIG. 2 is a block diagram, in cross-section, of a rotating optical reflector according to an embodiment of the present disclosure. In some embodiments, the optical reflector 204 of FIG. 2 may be used to implement the optical reflector 104 of FIG. 1. The optical reflector 204 includes a transmissive surface 206, a reflective surface 208, a first wedge-shaped component 250, and a second wedge-shaped component 252. The optical reflector 204 is coupled to a mounting collar 254, which may couple the optical reflector 204 to a motor (e.g., motor 110 of FIG. 1), not shown. To illustrate the operation of optical reflector 204, an incident light ray 214a and scanning light ray 214b are shown. Additionally, the axis of rotation 219 as well as a normal 218 to the reflective surface 208 are shown. The scanning light beam 214b may rotate about an axis 220 as the optical reflector 204 is rotated about the axis of rotation 219.

The optical reflector 204 may be rotated about an axis of rotation 219. In order to balance or minimize forces acting on the optical reflector 204, the optical reflector may be balanced such that the optical reflector has both static and dynamic balance about the axis of rotation 219. The axis of rotation 219 may approximately pass through the center of mass in order to achieve static balance. A principal axis of inertia (e.g., an axis of symmetry) of the optical reflector 204 may be approximately coincident with the axis of rotation 219 in order to achieve dynamic balance.

The optical reflector 204 may be shaped (e.g., as a cylinder) such that the optical reflector 204 is inherently approximately statically and dynamically balanced about the axis of rotation 219. The inherent balance of the optical reflector 204 may result in simplified assembly or manufacturing, low vibrations and low strain on bearings during rotation, which may allow for operation at high rotation rates. In some embodiments, in cases where fabrication and assembly tolerances do not result in sufficient balance for a desired rotation rate, the wedge assembly can be subjected to a balancing procedures where imbalance is measured and additional adjustment mass is added or subtracted to the optical reflector 204 to further improve the static and/or dynamic balance of the assembly. In some embodiments, during balancing, material may be removed from the wedge assembly to improve or fine-tune the balance.

FIG. 2 shows an example shape of the optical reflector 204 which may be used to achieve static and dynamic balance. FIG. 2 shows a cross-sectional view of the optical reflector 204, as seen from the 'side' (e.g., along a line perpendicular to the axis of rotation 219). In the example embodiment of FIG. 2, the optical reflector 204 may have a generally rectangular cross-section from the viewpoint shown (e.g., a view along a line perpendicular to the axis of rotation 219). The 'front' and 'back' surfaces of the optical reflector (e.g., as seen along the axis of rotation 219) may have symmetry about the axis of rotation 219. In the example embodiment of FIG. 2, the front and back surfaces may be generally circular, and thus the optical reflector may be generally cylindrical.

A mounting collar 254 may be attached to a back side (e.g., the side opposite transmissive surface 206) of the optical reflector 204. The mounting collar 254 may be used for attachment to a motor for rotation of the optical reflector 204. In some embodiments, the mounting collar 254 may include mounting hardware, such as a bearing assembly. In some embodiments, the mounting collar 254 may be coupled to the back of the optical reflector 204 with mounting hardware (e.g., screws). In some embodiments, the mounting collar 254 may be attached to the back of the optical reflector with a bonding agent, such as epoxy, cement, glue, or other chemical fixative.

In operation, an incident light ray 214a may be directed towards the optical reflector 204. For the sake of clarity, only a single incident light ray 214a and scanning light ray 214b are shown. However, it is to be understood that a plurality of light rays may strike the optical reflector 204. Similarly, it should be understood that the light path may be reversible, and that the light ray 214b may represent received light from a target, while the light ray 214a represents received light directed towards a detector (e.g., receiver 116 of FIG. 1).

The incident light ray 214a may be refracted as it passes from a medium outside the optical reflector 204 (e.g., air) and crosses the transmissive surface 206 into the transmissive material of a first wedge-shaped component 250 of the optical assembly 204. The material of the first wedge-shaped component 250 may be chosen so that it is has a low coefficient of scattering and absorption across the wavelengths expected for the emitted and received light. In some embodiments, a material with a large index of refraction may be desired to increase the deflection angle. The material may have an index of refraction which is greater than about 1.5 for the wavelength(s) of the emitted and/or received light. In some embodiments, the material may be a glass, such as BK7. In some embodiments, the material may be amorphous and/or non-crystalline.

The refracted light ray may pass through the material of the first wedge-shaped component 250 until it encounters the reflective surface 208. In some embodiments, the reflective surface 208 may be embedded within the optical reflector 204. In some embodiments, the reflective surface 208 may be formed at an interface of the first wedge-shaped component 250 and a second wedge-shaped component 252. The reflective surface 208 may be a reflective material and/or coating which reflects the refracted light. In some embodiments, the reflective surface 208 may reflect all or substantially all of the refracted light. The reflective surface may be a reflective coating on the first wedge-shaped component 250, or on the second wedge-shaped component 252. The reflective surface 208 may be chosen to reflect light across the wavelength(s) expected of the emitted and received light. The reflective surface 208 may provide reflected light based on an angle between the refracted light and the normal 218 to the reflective surface 208.

The reflected light from the reflective surface 208 may travel through the material of the first wedge-shaped component until it encounters the transmissive surface 206 a second time. The reflected light may then refract a second time upon crossing from the material of the first wedge-shaped component 250 back into the medium surrounding the optical reflector 204 (e.g., air) to become the scanning light ray 214b.

Due to the two refractions and the reflection of the incident light ray 214a by the optical reflector 204, the scanning beam 214b may be deviated from the path of the incident light ray 214a. The axis 220 is shown to represent a path that the scanning light may take if the normal 218 to the reflective surface 208 was parallel to the axis of rotation 219. As may be seen, the scanning light ray 214b has a non-zero angle to the axis 220 because the normal 218 to the reflective surface 208 is not parallel to the axis of rotation 219. Since the normal 218 to the reflective surface 208 is not parallel to the axis of rotation 219, as the optical reflector 204 is rotated about the axis of rotation 219, the angle at which the refracted light ray encounters the reflective surface 208 will change, and the scanning beam 214b will trace a path as it rotates about the axis 220. The light ray 214b may generally trace a conical shape. In some embodiments, the path traced by the light ray 214b where it intersects a surface (e.g., the ground) may be a closed path, such as a circle or ellipse. The path (and scanning action when combined with other motion) of the scanning beam 214b is discussed in more detail in FIG. 5.

Figure 3:
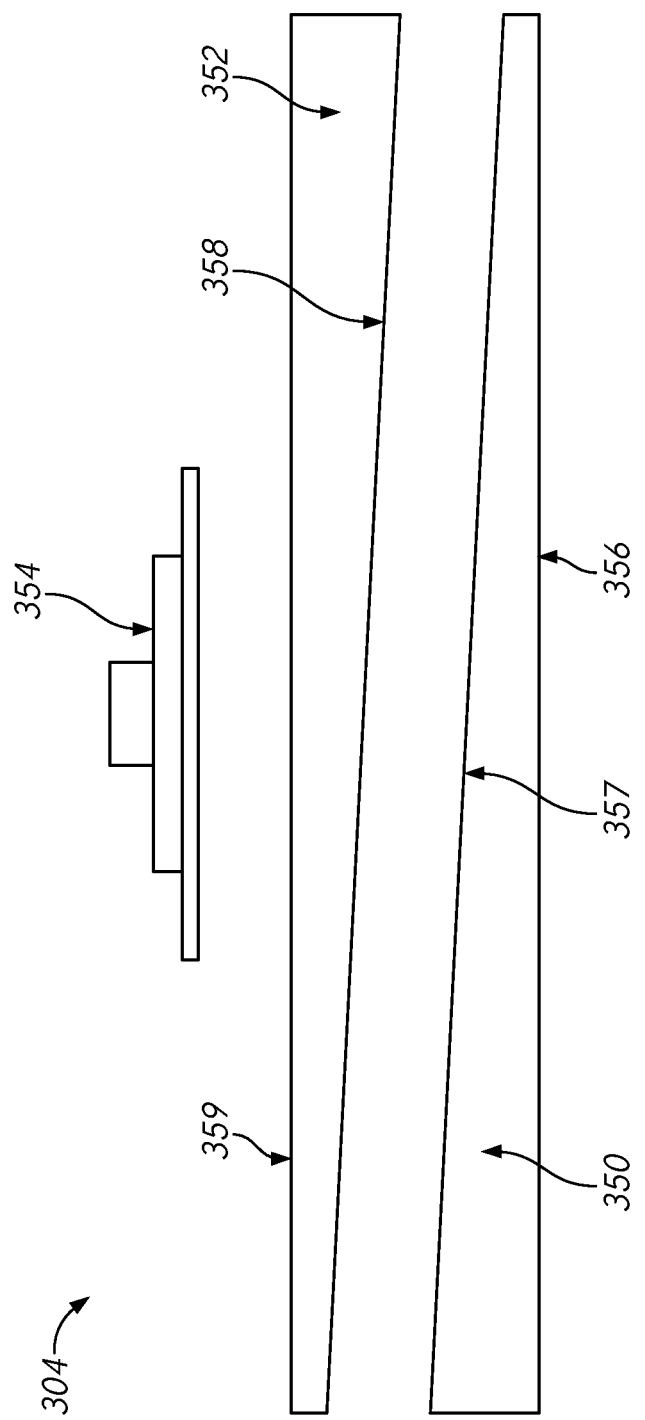
FIG. 3 is an exploded diagram in cross-section of a rotating optical reflector according to an embodiment of the present disclosure.

FIG. 3 is an exploded diagram in cross-section of a rotating optical reflector according to an embodiment of the present disclosure. The optical reflector 304 of FIG. 3 shows a potential method of assembling the optical reflector 104 of FIG. 1 (and/or the optical reflector 204 of FIG. 2) according to an embodiment of the present disclosure. The optical reflector 304 includes a first wedge-shaped component 350 which includes a first surface 356 and a second surface 357. The optical reflector also includes a second wedge-shaped component 352 with a first surface 358 and a second surface 359. The optical reflector 304 may also include a mounting collar 354.

The first surface 356 and the second surface 357 of the first wedge-shaped component 350 may lie at a wedge angle to each other. The first wedge-shaped component may have a generally trapezoidal cross section. In some embodiments, the cross section of the first wedge-shaped component may generally be a right trapezoid, with the second surface 357 forming the side which does not intersect at right angles. When viewed from the front, the first wedge-shaped component 350 may generally be round. In some embodiments, the first wedge-shaped component 350 may generally be circular when viewed from the front.

The first surface 356 of the first wedge-shaped component 350 may form the transmissive surface (e.g., transmissive surface 106 of FIG. 1) of the optical reflector 304. In some embodiments, the first surface 356 may be polished or otherwise smoothed to reduce unintended deviations from an optical path. In some embodiments, the first surface 356 may include an anti-reflection coating. The material of the first wedge-shaped component 350 may generally be transmissive to light (at least, over the expected wavelength(s) of the emitted and received light) and may generally correspond to the materials discussed in regards to the first wedge-shaped component 250 of FIG. 2.

The first wedge-shaped component 350 and the second wedge-shaped component 352 may be placed such that the second surface 357 of the first wedge-shaped component 350 is adjacent to the first surface 358 of the second wedge-shaped component 352. The interface between the surfaces 357, 358 may form the reflective surface (e.g., reflective surface 108 of FIG. 1) of the optical reflector. In some embodiments, one or both of the surfaces 357, 358 may be polished. In some embodiments, a reflective coating may be applied to one or both of the surfaces 357, 358.

To form the optical reflector 304, the second surface 357 of the first wedge-shaped component 350 and the first surface 358 of the second wedge-shaped component may be attached to each other. In some embodiments, an adhesive, such as a UV-cured adhesive, may be used to attach the first wedge-shaped component 350 to the second wedge-shaped component 352.

The shape and/or material of the second wedge-shaped component 352 may be chosen to achieve static and/or dynamic balance of the assembled optical reflector 304. In some embodiments, the second wedge-shaped component may have the same wedge angle and/or other physical dimensions as the first wedge-shaped component. In some embodiments, the second wedge-shaped component 352 may have the same shape as the first wedge-shaped component 350. In some embodiments, the second wedge-shaped component 352 may be made of the same type material as the first wedge-shaped component 350. In some embodiments, the first wedge-shaped component 350 and the second wedge-shaped component 352 may have approximately the same coefficient of thermal expansion and/or density.

In some embodiments, the second surface 359 of the second wedge-shaped component 352 may have relaxed tolerances compared to the other surfaces 356-358. In some embodiments, the second surface 359 may be ground (rather than polished).

The mounting collar 354 may be attached to the second surface 359 of the second wedge-shaped component 352. In some embodiments, the mounting collar 354 may be made, at least partially, of metal. In some embodiments, the mounting collar 354 may have a similar coefficient of thermal expansion as the first and/or second wedge-shaped components 350, 352. In some embodiments, the mounting collar 354 may be attached to the second surface 359 using an adhesive, such as a UV-cured adhesive. In some embodiments, the same adhesive may be used for attaching the mounting collar 354 to the second wedge-shaped component 352 and for attaching the first and second wedge-shaped components 350, 352 to each other.

Figure 4:
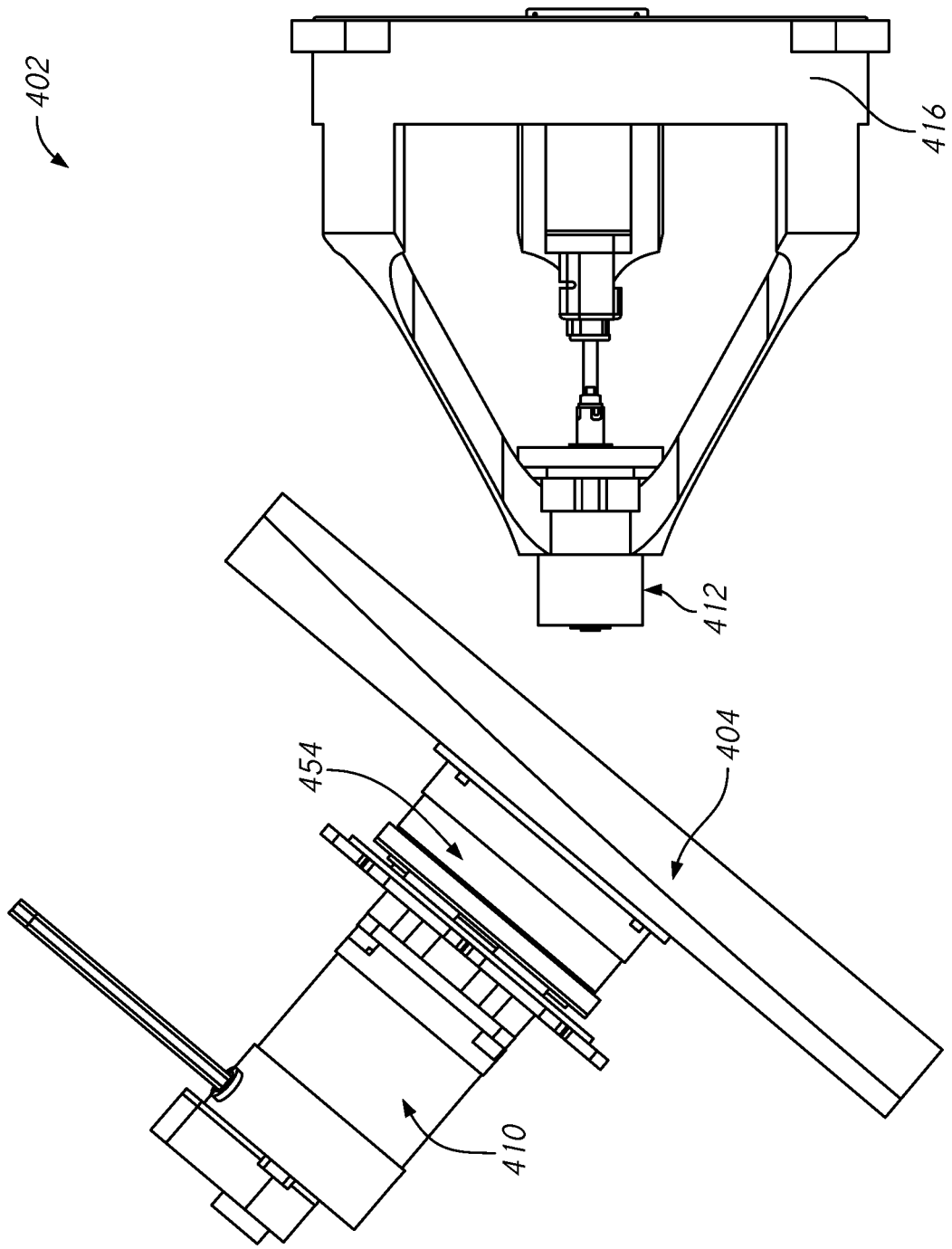
FIG. 4 is a block diagram of a scanning system according to an embodiment of the present disclosure.

FIG. 4 is a block diagram of a scanning system according to an embodiment of the present disclosure. In some embodiments, the scanning system 402 may be used to implement the scanning system 102 of FIG. 1. The scanning system 402 includes an optical reflector 404, which is coupled to a motor 410 via a mounting collar 454. The scanning system 402 also includes a transmitter 412 and a receiver 416.

As shown in the example embodiment of FIG. 4, the transmitter 412 and receiver 416 may be coupled together into a transceiver. In some embodiments, the transmitter 412 may comprise a laser or fiber optic that delivers laser light. In some embodiments, the receiver 416 may include a detector and one or more optics (e.g., mirrors, lenses, filters, etc.) to direct received light onto the detector. In some embodiments, the receiver 416 may include optics arranged into a telescope.

In some embodiments, the transmitter 412 may be positioned such that light is emitted generally along an optical axis of the transceiver. A normal to the surface of the receiver passing through the center of the receiver may also generally align with the optical axis of the transceiver. The optical axis of the transceiver may be aligned with a center of the optical reflector 404.

The optical reflector 404 is attached to a mounting collar 454. The mounting collar 454 is coupled to the motor 410. In some embodiments, one or more pieces of mounting hardware, such as a bearing assembly, may be used to attach the mounting collar 454 to the motor 410.

In some embodiments, the motor 410 and the transceiver (including the transmitter 412 and receiver 416) may be coupled to a frame and/or enclosure. The mounting of the motor 410 and the transceiver may determine a distance between the transceiver and the optical reflector 404, and the angle between the transceiver and the optical reflector 404. In some embodiments, the distance and/or angle may be adjustable.

In an example embodiment, a normal to the transmissive face of the optical reflector 404 (e.g., the axis of rotation of the optical reflector 404) may be at an angle of 40° to the transceiver (e.g., to the optical axis of the transceiver). In some embodiments, it may be desirable to minimize the angle between optical axis of the transceiver and the axis of rotation of the optical reflector 404. This may relax the angular requirements on the wedge optical coatings and minimize the diameter and thickness requirements of the wedge assembly.

Figure 5:
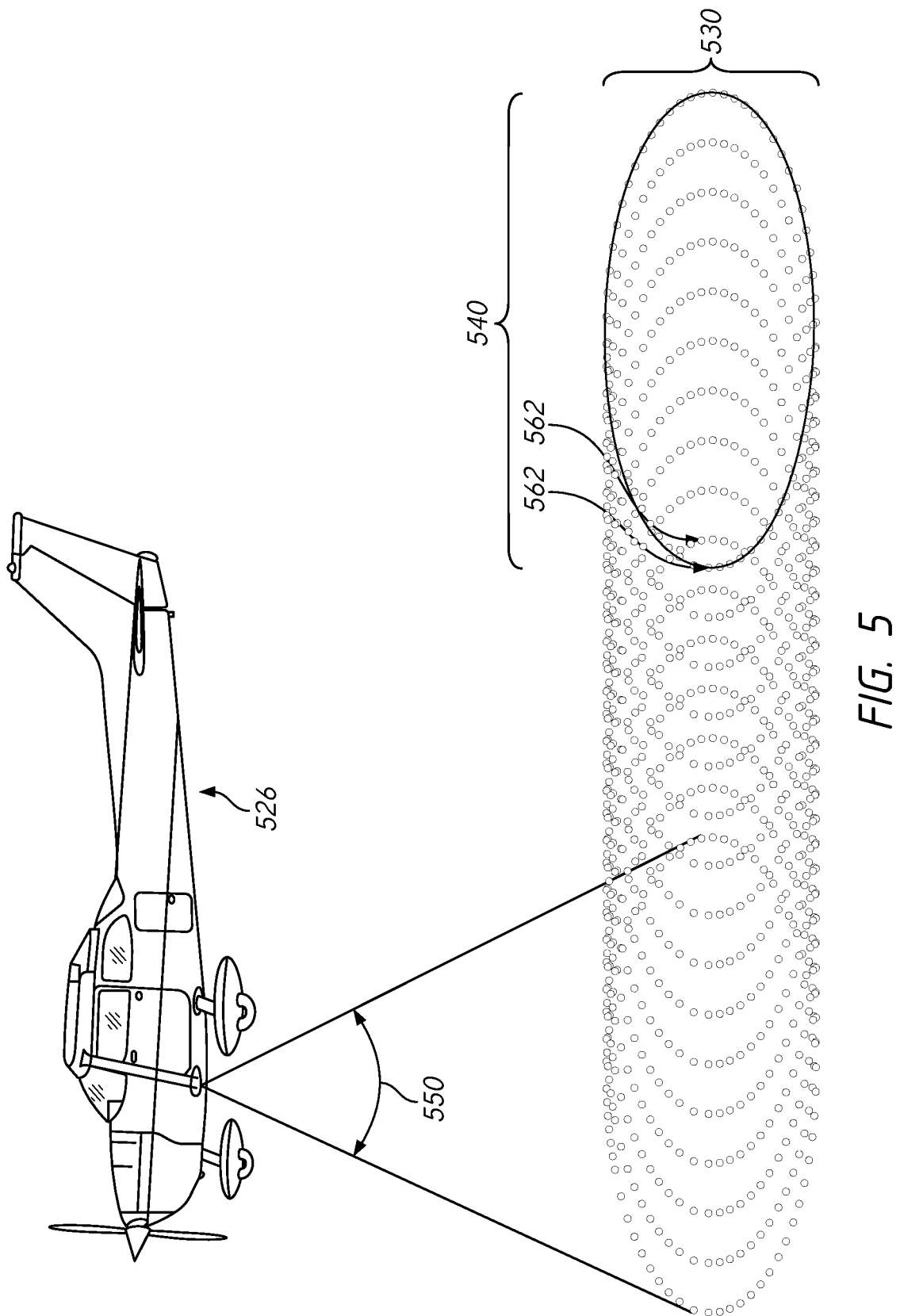
FIG. 5 is a diagram of measurements collected by a measurement system according to an embodiment of the present disclosure.

FIG. 5 is a diagram of measurements collected by a measurement system according to an embodiment of the present disclosure. FIG. 5 shows a mobile platform 526, which may be equipped with the measurement system 100 of FIG. 1 in some embodiments. The measurement system may record measurements from individual measurement points or areas 562, the size and shape of which may be based, at least in part, on a telescope field of view, an optical reflector rotation speed, and a mobile platform speed, a measurement integration time, or combinations thereof. While individual measurement areas 562 are shown to be circular in shape in FIG. 5, they may be any shape. As one rotation of an optical reflector is completed, a plurality of individual measurement areas 562 may trace out one cycle of a scan path 530 (which may be, for example, a helical shape). As discussed in regards to FIGS. 1-4, the rotation of an optical reflector, without the motion of the mobile platform 562, may cause individual measurement areas 562 to trace out cycle 540, each of which may correspond to one complete rotation of an optical reflector. Multiple cycles 540 may be extended to follow the extended helical scan path 530 by the motion of the mobile platform 526 relative to a target area.

The individual measurement areas 562 may represent an area from which the measurement system can record data. Each individual measurement area 562 may represent the largest area across which light rays pointed at the measurement system strike a detector portion of the receiver. In some embodiments, the measurement areas 562 may be a field of view of the measurement system. As shown in FIG. 5, each individual measurement area 562 represents a specific measurement taken by the measurement system, which may sample measurements at a measurement rate. Thus, while the optics may be swept constantly along the scan path 530, individual measurement areas 562 are shown to represent the measurements recorded by the measurement system.

Rotation of an optical reflector may result in a scan over a field of regard (FOR) 550 that may depend, at least in part, on the wedge angle (O w), which is the angle between the reflective surface and the transmissive surface of the optical reflector, and the index of refraction (n w) of the material between the transmissive and reflective surfaces of the optical reflector. In some embodiments, the size of the FOR 550 may be approximated by equation 1, below:

$$FOR = 4n_w \theta_w \qquad \text{Eqn. 1}$$

From equation 1, it can be seen that the size of the FOR 550 may be increased either by increasing the refractive index ($n_w$) or by increasing the wedge angle ($\theta_w$). In some embodiments, it may be desirable to use a material with a higher index of refraction (e.g., above about 1.5), which may allow a smaller wedge angle ($\theta_w$) to be used to achieve a given field of regard. Using a smaller wedge angle ($\theta_w$) may advantageous for reducing the size and/or weight of the optical reflector.

Without the motion of the mobile platform 526, the optics (e.g., the individual measurement areas 562) may be swept around a closed path (e.g., one cycle 540) by the rotation of the optical reflector. Motion of the mobile platform 526 may extend the sweeping of the individual measurement areas 562 such that they follow an elongated scan path 530, which may generally be helical in shape. The measurement and/or motion parameters may be chosen such that the individual measurement areas 562 of each rotation of the optical reflector are interleaved with the individual measurement areas 562 traced by one or more additional rotations of the optical reflector (e.g., the cycles 540 may have shapes which overlap with each other). This may allow a more even distribution of individual measurement areas 562 about the scanned area.

In some embodiments, the distribution of the individual measurement areas 562 about the scan path 530 may be given by equation 2, below:

$$T_R = \sqrt{\frac{2L_c}{vF_s}} \qquad \text{Eqn. 2}$$

In equation 2, $T_R$ is the rotational period of the optical reflector, $L_C$ is the circumference of the scan pattern, v is the velocity of the mobile platform 526, and $F_S$ is the measurement rate (e.g., the sampling rate). One or more of these properties may be adjusted in order to achieve a desired distribution of the individual measurement areas 562.

In some embodiments, such as the one shown in the example of FIG. 5, a closed path (e.g., a cycle 540) swept by the individual measurement areas 562 without motion of the mobile platform 526 may be elliptical, with a long axis and a short axis. FIG. 5 shows an embodiment where the long axis of the ellipse is generally aligned with the direction of motion of the mobile platform 526. In some embodiments, the short axis may be aligned with the direction of motion of the mobile platform 526 (e.g., the long axis may be perpendicular to the direction of motion). This may be advantageous for increasing a field of regard 550 as the mobile platform 526 travels around the target area.

Of course, it is to be appreciated that any one of the examples, embodiments or processes described herein may be combined with one or more other examples, embodiments and/or processes or be separated and/or performed amongst separate devices or device portions in accordance with the present systems, devices and methods.

Finally, the above-discussion is intended to be merely illustrative of the present system and should not be construed as limiting the appended claims to any particular embodiment or group of embodiments. Thus, while the present system has been described in particular detail with reference to exemplary embodiments, it should also be appreciated that numerous modifications and alternative embodiments may be devised by those having ordinary skill in the art without departing from the broader and intended spirit and scope of the present system as set forth in the claims that follow. Accordingly, the specification and drawings are to be regarded in an illustrative manner and are not intended to limit the scope of the appended claims.

What is claimed is:

1. An apparatus comprising:
an optical reflector comprising a solid transmissive material and a reflective surface, wherein the transmissive material is positioned to refract incident light toward the reflective surface, and wherein the solid transmissive material has a first surface; and
a motor configured to rotate the optical reflector about an axis of rotation, wherein a normal to the reflective surface is not parallel to the axis of rotation, wherein light which enters the transmissive material through the first surface and reflects off the reflective surface also exists exits the transmissive material through the first surface as a scanned beam.

2. The apparatus of claim 1, wherein the solid transmissive material is wedge shaped.

3. The apparatus of claim 2, wherein the solid transmissive material comprises the first surface and a second surface opposite the first surface, wherein the second surface is proximal to the reflective surface, and wherein the first surface and the second surface are not parallel to each other.

4. The apparatus of claim 1, wherein the solid transmissive material is bonded to a second material, and wherein the reflective surface is at an interface of the transmissive material and the second material.

5. The apparatus of claim 1, wherein the solid transmissive material and the second material have generally a same coefficient of thermal expansion and/or density.

6. The apparatus of claim 1, wherein an inertial axis of the optical reflector is generally coincident with the axis of rotation.

7. The apparatus of claim 1, further comprising a source configured to direct the light towards the optical reflector and wherein the scanned beam is scanned across a target area.

8. The apparatus of claim 1, wherein a normal to the first surface is parallel to the axis of rotation.

9. The apparatus of claim 1, wherein the scanned beam is rotated about an axis as the optical reflector is rotated by the motor, and wherein the scanned beam has a non-zero angle with the axis.

10. The apparatus of claim 9, wherein the scanned beam traces a generally conical shape about the axis.

11. An apparatus comprising:
an optical reflector comprising:
a first wedge shaped solid material comprising a first surface and a second surface opposite the first surface; and
a second wedge shaped solid material comprising a third surface and a fourth surface opposite the third surface, wherein a reflective surface is positioned at an interface between the second surface and the third surface;
a motor configured to rotate the optical reflector about an axis of rotation, wherein the axis of rotation is not parallel to a normal of the reflective surface; and
a light source configured to direct light towards the first surface, wherein the light passes through the first surface, reflects off the reflective surface and exits through the first surface as a scanned beam towards a target area.

12. The apparatus of claim 11, wherein the first surface and the reflective surface are not parallel.

13. The apparatus of claim 11, wherein an inertial axis of the optical reflector is generally coincident with the axis of rotation.

14. The apparatus of claim 11, further comprising a receiver, wherein light from the target area passes through the first surface, reflects off the reflective surface, and exits through the first surface towards the receiver as received light.

15. The apparatus of claim 11, further comprising a mobile platform configured to move relative to the target area, the mobile platform configured to support the optical reflector, the motor, and the light source.

16. The apparatus of claim 11, wherein the first wedge shaped solid material is bonded to the second wedge shaped solid material along an interface between the second surface and the third surface.

17. The apparatus of claim 11, wherein the first surface is not parallel to the second surface and the third surface is not parallel to the fourth surface.

18. The apparatus of claim 11, wherein the reflective surface includes a reflective coating on the second surface, the third surface, or combinations thereof.

19. A method comprising:
directing incident light towards a first surface of an optical reflector, the optical reflector comprising a reflective surface and a solid transmissive material having the first surface;
rotating the optical reflector about an axis of rotation, wherein the axis of rotation is not parallel to a normal of the reflective surface; and
scanning a scanned beam across a target area, wherein the light enters the solid transmissive material through the first surface, reflects off the reflective surface and exits the solid transmissive material through the first surface as the scanned beam.

20. The method of claim 19, further comprising:
receiving light from the target area, wherein the light enters the solid transmissive material through the first surface, reflects off the reflective surface and exits the transmissive material through the first surface as received light;
directing the received light to a detector.

21. The method of claim 20, further comprising determining a measurement based on the received light.

22. The method of claim 19, further comprising moving the optical reflector relative to the target area with a mobile platform.

23. The method of claim 19, further comprising adjusting a mass distribution and/or shape of the optical reflector such that an inertial axis of the optical reflector is coincident with the axis of rotation.

24. The method of claim 19, further comprising bonding the solid transmissive material to a second material, wherein the reflective surface is positioned at an interface between the solid transmissive material and the second material.

* * * * *